United States Patent [19]
Richardson et al.

[11] 3,726,732
[45] Apr. 10, 1973

[54] MULTI-STEP ETCHING PROJECTION SYSTEM

[75] Inventors: Robert W. Richardson, Wilmington, Del.; James J. Keegan, III, Upper Darby, Pa.

[73] Assignee: The Franklin Mint, Inc., Franklin Center, Pa.

[22] Filed: July 9, 1970

[21] Appl. No.: 53,358

[52] U.S. Cl. ....................... 156/11, 96/36, 156/345
[51] Int. Cl. ....................... C23f 1/02
[58] Field of Search ....................... 156/7, 8, 11, 18, 156/345; 96/36, 36.3; 72/359

[56] References Cited

UNITED STATES PATENTS

| | | | |
|---|---|---|---|
| 3,428,503 | 2/1969 | Beckerle | 156/11 |
| 3,415,699 | 12/1968 | Brown | 156/11 X |
| 2,907,657 | 10/1959 | Kott | 96/36.3 |
| 2,854,336 | 9/1958 | Gutknecht | 156/11 X |
| 3,185,568 | 5/1965 | Downie et al. | 156/11 X |

*Primary Examiner*—William A. Powell
*Attorney*—Seidel, Gonda and Goldhammer

[57] ABSTRACT

An optical projection system employing ultraviolet light for step projection and repeat projection of imagery to the surface of a photoresist coated coining die so that the die may be etched to various levels in registration with other projections. This permits photofabrication of dies of various sizes from a single series of step and repeat photographic negatives, each of which is in photographic registration to each other and to the respective etched surface of the coining die being fabricated. Filtered light permits visual examination of the projected imagery prior to exposure of the photoresist surface on the die. Enlargements and reductions are also possible with suitable lens systems.

6 Claims, 10 Drawing Figures

INVENTORS
ROBERT W. RICHARDSON
JAMES J. KEEGAN, III
BY
Seidel, Gonda & Goldhammer
ATTORNEYS INVENTORS
ROBERT W. RICHARDSON
JAMES J. KEEGAN
BY
Seidel, Gonda & Goldhammer
ATTORNEYS INVENTORS
ROBERT W. RICHARDSON
JAMES J. KEEGAN, III
BY
Seidel, Gonda & Goldhammer
ATTORNEYS

MULTI-STEP ETCHING PROJECTION SYSTEM

This invention relates to an optical projection system wherein ultraviolet light is utilized at a suitable energy level for projection and repeat projection of imagery to a photoresist coated coining die. The system permits the fabrication of coining dies etched to various levels, with each level etched in registration with other etchings at different levels and equal in quality to that currently attained using standard electric discharge machining techniques.

The system of the present invention permits the photofabrication of coining dies of various sizes from a single series of photographic negatives. Each of the negatives will be in photographic registration with one another and to the photoresist surface of the coining die being fabricated by means of chemical etching techniques.

The present invention utilizes an ultraviolet filter system which permits the visual examination of the projected imagery directly on the photographic resist surface prior to exposure of the resist surface. This provides a means for checking one image registration with previous etched imagery. The die being etched is supported by a retaining fixture having registration in conjunction with its support so that it may be repeatedly mechanically realigned with its true optical axial position.

The method of the present invention includes the following steps. A coining die blank has its end face coated with a photoresist material and is supported so that a photographic image may be projected on the end face of the coining die. When the negative is projected on the photoresist surface, whereby a portion of the surface "sees" light from the negative and is rendered soluble when developed in accordance with standard photographic techniques. Thereafter, another image is projected on the partially etched die and registered by means of a standard key bar system with the previous etching. By use of an ultraviolet filter, it is possible to project the second image for purposes of registration without exposing the photoresist surface. Thereafter, the projection is repeated and the photoresist surface of the die is again developed in accordance with standard photographic techniques.

The sequence of steps set forth in the next preceding paragraph is repeated the desired number of times so as to attain a multi-level coining die by use of a multi-step projection system. After each exposure of the photoresist surface and subsequent etching the surface is stripped and recoated with photoresist material. The depth of each etching need not be great and may be only on the level of 0.002 or 0.003 inches.

The present invention has many advantages over the systems proposed heretofore. The present invention enables the entire die fabrication technique to be done "in house", thereby providing security and materially reduces the time needed to produce a die. Security is attained in that it is not necessary to send perspective artwork to some other entity for the preparation of EDM electrodes necessary to produce the die. Secondly, one piece of artwork is needed which can be enlarged or reduced optically to any size die. Hence, it is no longer necessary to make separate photographic artwork for each die size.

It is another advantage of the present invention that the die surface need not be flat. Hence, it is possible to manufacture plaques having various levels of surfaces thereon by means of the present invention. Further, the present invention enables an image to be projected without polymerization of the photoresist material for purposes of registration as well as artistic appraisal of its orientation to various other surfaces to be etched.

It is an object of the present invention to provide a novel-multi-stop etching projection system for coining dies.

It is another object of the present invention to provide a multi-step etching projection system for coining dies which is more advantageous than standard techniques utilized heretofore.

It is another object of the present invention to provide method for etching coining dies which is faster and cheaper than those utilized heretofore in connection with multi-step coining dies.

It is another object of the present invention to provide a method for producing coining dies which does not require the artwork to be sent outside the facility, thereby providing greater security.

It is another object of the present invention to provide a method for multi-step etching coining dies which reduces the amount of artwork necessary, whereby one set of negatives may be utilized for etching dies of various sizes.

Other objects will appear hereinafter.

For the purpose of illustrating the invention, there is shown in the drawings a form which is presently preferred; it being understood, however, that this invention is not limited to the precise arrangements and instrumentalities shown.

Figures 1, 8, 9, 10:
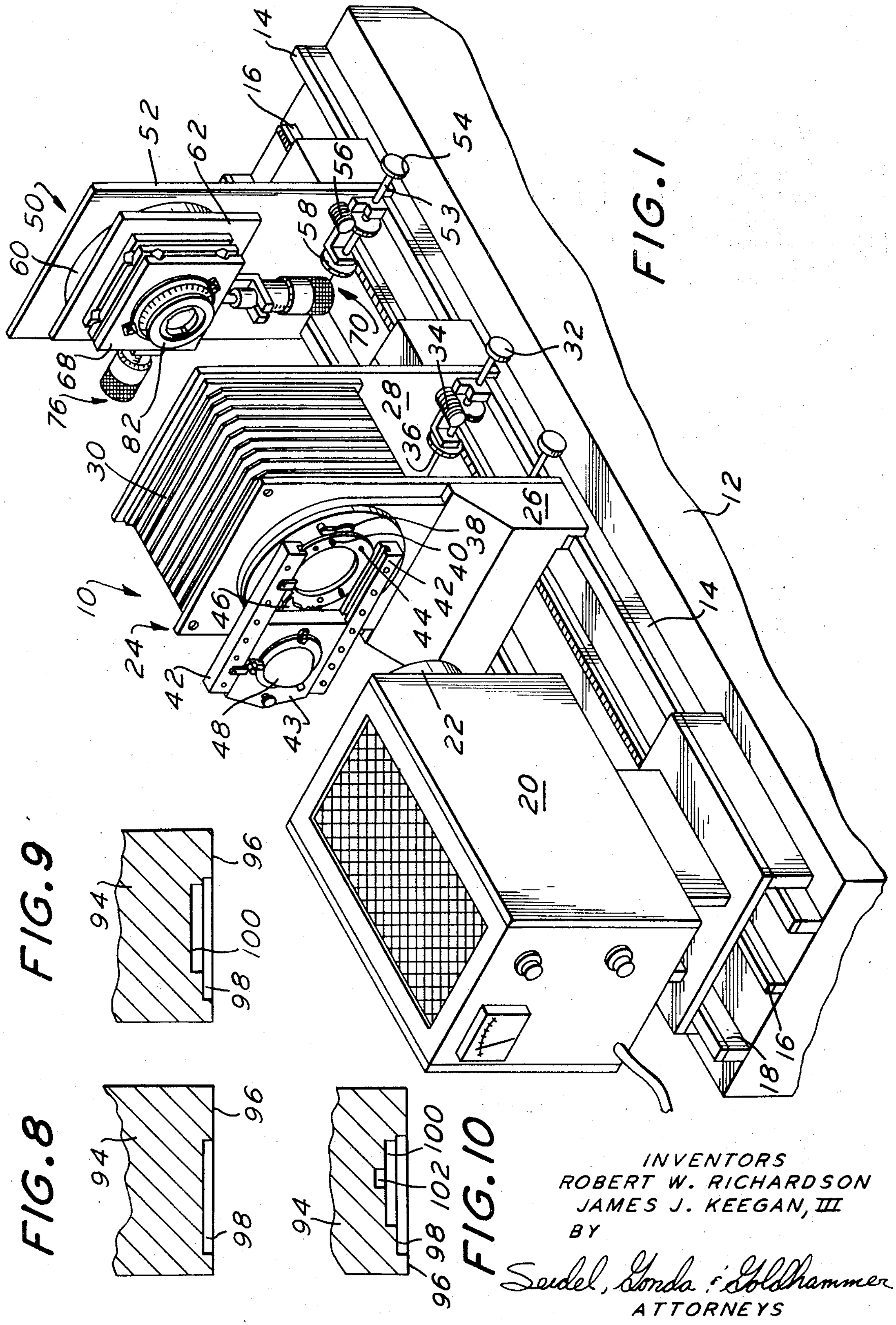
FIG. 1 is a perspective view of the apparatus of the present invention.
FIGS. 8–10 are a sequential illustration of sectional views showing the various etchings to different depths on the coining die made in accordance with the three-step process of the present invention.
Figure 2:
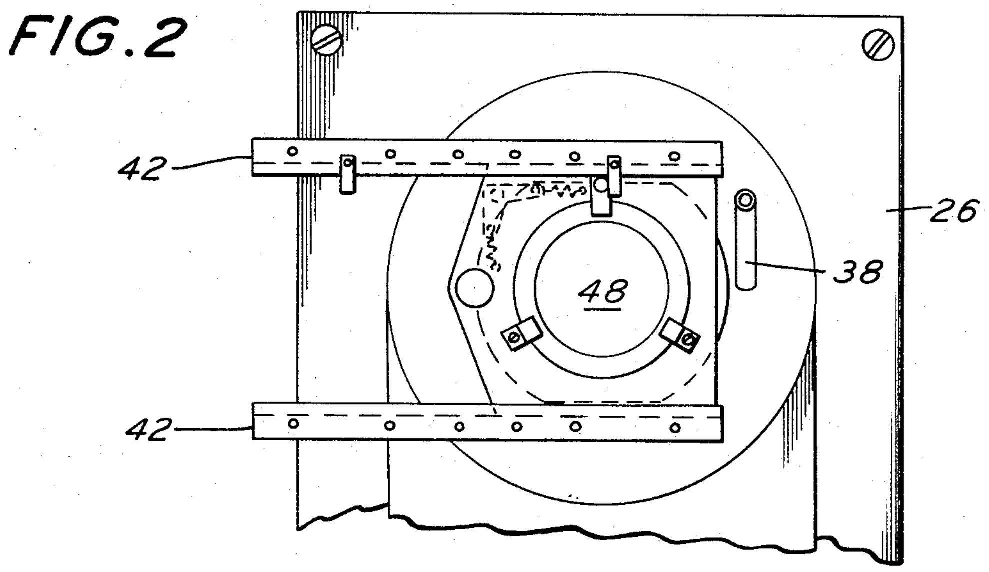
FIG. 2 is a front elevation view of one end of the camera where the negative is supported.
Figure 3:
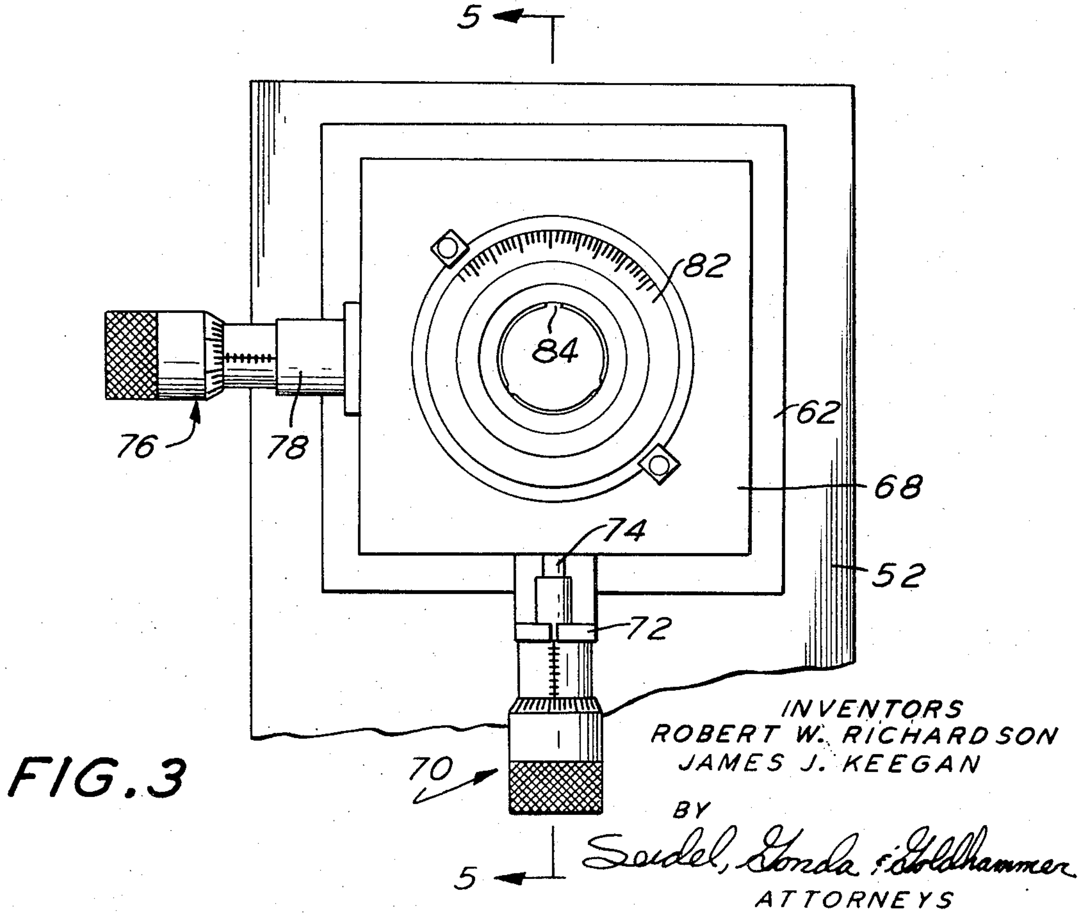
FIG. 3 is a partial front elevation view of the die holder means.
Figure 4:
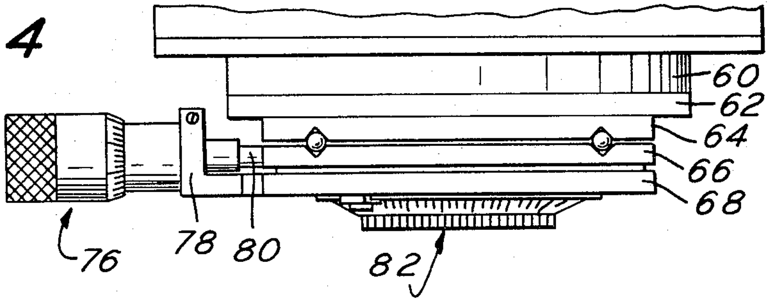
FIG. 4 is a top plan view of the die holder means shown in FIG. 3.
Figure 5:
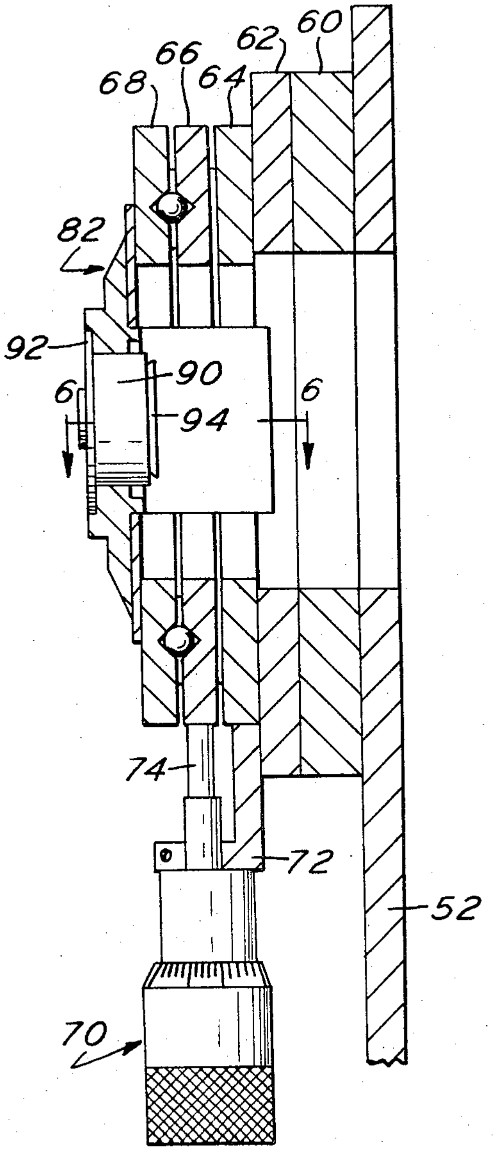
FIG. 5 is a sectional view taken along the line 5—5 in FIG. 3.

Referring to the drawing in detail, wherein like numerals indicate like elements, there is shown a multi-step etching projection system exemplary of the present invention designated generally as 10. The system 10 includes a support such as a bench 12 having parallel ways 14, 16 and 18 on its upper surface. The upper surface of way 16 is provided with gear teeth so as to be in the form of a rack for a purpose to be made clear hereinafter and may be of a type commercially available such as the Dekacon III sold by the HLC Corporation of Willow Grove, Pa.

An ultraviolet light source 20 is adjustably supported by the ways 14 and 18. Threaded knobs for retaining the source 20 in any predetermined position are not shown. The source 20 may be adjusted along the ways 14 and 18 to any desired position. The ultraviolet light source 20 is provided with an ultraviolet shutter 22 containing an ultraviolet filter and may be of a type commercially available such as Model 42F sold by Christy Electric Company of Los Angeles, Calif.

A camera 24 is adjustably supported by the ways 14–18. Camera 24 includes a first frame 26 and a second frame 28 interconnected by a standard bellows 30. Each of the frames is independently adjustable along the ways 14–18. Since the adjustment means for the frames 26 and 28 are identical, only the means associated with frame 28 will be described in detail.

A shaft terminating in one end at knob 32 is rotatably supported by a bracket on the second frame 28. The shaft is provided with a pinion meshingly engaged with a threaded member 34 fixedly secured to frame 28. The shaft is also provided with a pinion 36 in meshing engagement with the rack on the upper surface of way 16. Rotation of knob 32 causes the frame 28 to move along the ways 14—16.

The first frame 26 is adapted to support the negative and condenser. The negatives are to be registered by three pins 40 and releasably clamped by two negative holder clamps 38. Three focusing pads 44 are provided against which the negative holder will be engaged. A floating negative holder clamp 46 is provided.

The condenser 48 is mounted on holder 43 which is reciprocably supported by ways 42. The holder 43 is adjustable in a direction transverse to the die axis so that the negative can be positioned behind the condenser 48.

A die holder means 50 is provided at the righthand end of the bench 12. Die holder 50 is adjustable along a length of the ways 14-18 in the same manner as the frames 26 and 28 of the camera 24.

Thus, the die holder means 50 includes a vertically disposed plate 52 containing a U-shaped bracket which in turn supports a horizontal shaft 53 terminating in knob 54. Shaft 53 has a pinion meshed with threaded member 6 on plate 52 and a pinion 58 meshed with the rack on the upper surface of way 16.

The surface of plate 52 juxtaposed to the camera 24 is provided with a boss formed by ring 60. A plate 62 is secured to the ring 60 which in turn is secured to the plate 52. An X–Y stage adjustment means is provided on plate 62. Such adjustment means includes plates 64, 66 and 68. A vernier adjustment means 70 is supported by bracket 72 depending from plate 64. The adjustment means 70 is provided with a stem 74 connected to plate 66.

Rotation of the adjustment means 70 will cause plates 66 and 68 and the structure supported thereby to move vertically relative to plate 64. A horizontal adjustment means 76, identical with means 70, is supported by bracket 78. Bracket 78 is connected to plate 68. The stem 80 from means 76 is connected to plate 66. Rotation of adjustment means 76 causes plates 64 and 66 to move in a horizontal direction relative to plates 62 and 68. Accordingly, a die holder supported by the X—Y stage may be moved horizontally or vertically perpendicular to the axis of projection of the negative. Adjustment of the die holder in a Z direction is attained by rotation of knob 54 to move the entire die holder means 50 toward and away from the negative.

A calibrated die mount 82 is rotatably supported on plate 68 for rotation about the projection axis. Mount 82 is provided with a rectangular groove 84 and a pair of circular grooves 88 on its inner periphery. Mating ribs 86 on the outer periphery of the die retainer 90 are received within the grooves. The retainer 90 is provided with a flange 92 which is received within a countersunk hole on the face of the mount 82. The rib and groove relationship assures uniform registration of the retainer 90 and the die 94 supported thereby.

Figure 6:
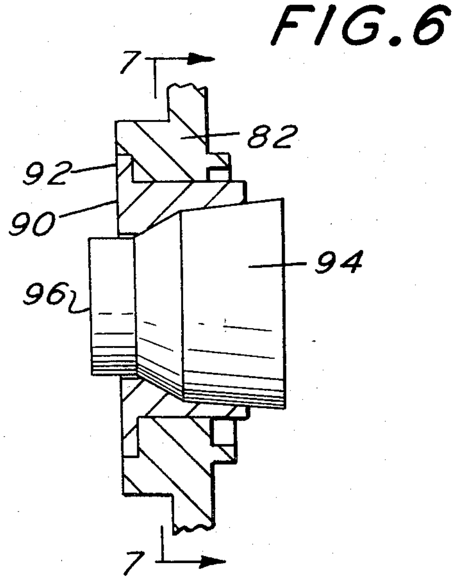
FIG. 6 is a sectional view taken along the line 6—6 in FIG. 5.
Figure 7:
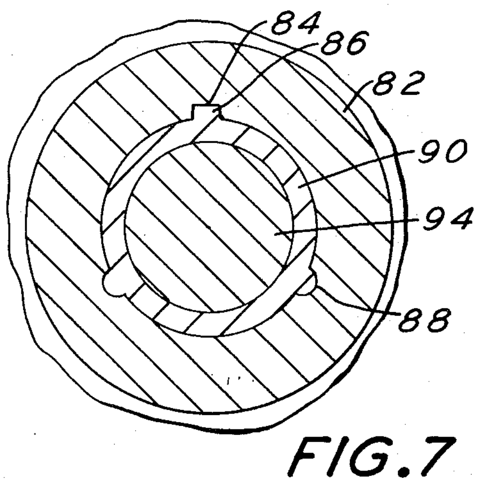
FIG. 7 is a sectional view taken along the line 7—7 in FIG. 6.

The die 94 is force-fitted within the annular retainer 90. Retainer 90 is preferably made from a cast plastic. The surface 96 of die 94 to be etched projects from the front face of the retainer 90 as will be apparent in FIG. 6.

The system of the present invention may be utilized to sequentially etch the surface 96 of die 94 to different depths with great precision. A typical material for die 94 would be 52–100 tool steel. The die 94 would be prepared in accordance with standard procedures of machining the surface 96 to the desired smoothness with subsequent lapping to improve the surface finish and the adhesion thereof so that a photoresist of uniform thickness may be applied. The photoresist must be an autopositive resist whereby the image projected thereon which sees light from the negative would be rendered soluble, whereas all other portions of the photoresist would remain during the photographic developing technique and acid etch. A suitable photoresist material is Kodak KAR—Type—3.

With the die 94 and its retainer 90 positioned within the mount 82, the sequential steps for etching the surface 98 are as follows. It is assumed that the surface 96 has been coated with the above-mentioned photoresist material. To improve adhesion and reduce sensitivity so as to permit longer exposure times, the photoresist material is baked on the die for 20 minutes under convection heat of 115° to 130°F. The photoresist material is preferably applied by spin coating, i.e., it is poured on the die face which is rotated about a vertical axis at about 500–700 rpm. The negative containing the artwork to be projected on surface 96 is properly orientated by projecting filtered ultraviolet light from source 20 through the negative onto the surface 96 of the die 94. Once the projected image has been properly registered, the filter is removed and the image exposed on the photoresist material on surface 96.

Exposure time is extremely important for sharp definition. I have found 15–30 seconds to be proper. If underexposed, the photoresist material will not polymerize. If overexposed, back reflection and halation will polymerize undesired portions of the photoresist material. Thereafter, the photoresist material is developed. Those portions of the die that have been exposed and developed away are now subject to an acid etch so as to produce the cavity 98.

Thereafter, the die 94 will be replaced in its support means and a new negative will be substituted for the previous negative. The surface 96 and the surface defining the cavity is recoated with the same photoresist material. Thereafter, the image of the second negative may be registered with the cavity 98 by use of ultraviolet filtered light from source 20. Thereafter, the filter is removed and the image on the second negative is projected onto the photoresist material within cavity 98 and on surface 96. The portions of the die containing photoresist which see light will be developed away exposing the surface for etching so as to produce the cavity 100. For purposes of illustration, the cavity 100 is within the confines of the cavity 98 but need not be so located. The above steps are repeated with a third negative so as to produce the cavity 102 which likewise need not be within the periphery of cavity 100, but is so illustrated for purposes of disclosure.

A typical coining die has printed material as well as a representation of a figure. The first acid etch may remove all material so as to leave a rim on the surface 96, printed matter, and a representation of a figure which is disconnected with the printed matter. The second and third etchings may be solely orientated with the representation of a figure so as to add depth or other configurations to the figure. It will be apparent to those skilled in the art that the multi-step etching system of the present invention is not limited to a three step system and is not limited to use with coining dies. Also, it should be obvious that cavity 102 may be made before cavity 98.

Thus, it will be seen that I have disclosed a multistep etching projection system which accomplishes the objects identified heretofore and has the advantages described above.

The present invention may be embodied in other specific forms without departing from the spirit or essential attributes thereof and, accordingly, reference should be made to the appended claims, rather than to the foregoing specification as indicating the scope of the invention.

We claim:

1. A method of etching a metal die comprising the steps of coating a die face of a metal die with autopositive photoresist material, positioning the die so that the die face is orientated to receive a projected image, projecting the image of a negative on said coating of photoresist material, developing the projected image to remove the portion of photoresist material which has been exposed to light, etching the portion of the die face which is not longer coated with the photoresist material to form a first cavity in said die face, recoating the surface of said die face and said cavity with said photoresist material, projecting a second different image on the photoresist material on said recoated die face, projecting light from an ultraviolet source on the die face, orientating the second image with respect to the die face while the ultraviolet light is projected on the die face and before the second image is exposed on the photoresist material, developing the second image and removing a portion of the photoresist material exposed to light from the second image, and then etching the portion of the die face which is not coated with the photoresist material to form a second cavity in the die face which is at a different elevation from the first cavity.

2. A method in accordance with claim 1 wherein said step of projecting a second image includes projecting the second image so that it at least partially overlies the first cavity.

3. A method in accordance with claim 1 including using a tool steel as the metal from which the die is made, and using an acid to etch the cavities.

4. A method in accordance with claim 1 including the step of coining coins by use of said etched die face.

5. A method in accordance with claim 1 wherein application of the photoresist material includes pouring it onto the die face while the die face rotates about a vertical axis.

6. A method in accordance with claim 1 including baking the photoresist material on the die face before each exposure, to reduce sensitivity of the photographic resist.

* * * * *